United States Patent Office 3,412,075
Patented Nov. 19, 1968

3,412,075
PRODUCTION OF 1,3-DIENE POLYMERS
Herbert Naarmann, Ludwigshafen (Rhine), and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed Mar. 9, 1965, Ser. No. 438,407
Claims priority, application Germany, Mar. 13, 1964, B 75,895
4 Claims. (Cl. 260—78.5)

ABSTRACT OF THE DISCLOSURE

A process for producing 1,3-diene polymers in which polymerization catalysts are used consisting of complex compounds of trivalent or tetravalent cobalt having ligands containing nitrogen and organic halogen compounds which are water inert. One of the advantages of the process is that stabilizers such as trinonylphenyl phosphite can be added before or during polymerization as well as after polymerization. The polymers are obtained in the form of an aqueous dispersion which in general contains from 5 to 50% by weight of polymer.

---

This invention relates to a process for the production of polymers of 1,3-dienes, such as butadiene.

It is known that 1,3-dienes may be polymerized using catalysts of compounds, which are stable in water, of transition metals of groups VII and VIII of the Periodic System of Elements (i.e. groups VII$b$ and VIII of the Periodic Chart of the Elements, Handbook of Chemistry and Physics, 38th edition, page 394, Chemical Rubber Publishing Co., Cleveland, Ohio, U.S.A., 1956) in aqueous emulsion. To achieve economically tolerable conversions, very large amounts of catalysts are required with reference to the polymer obtained, for example about 15 parts of catalyst to 100 parts of polymer. Moreover it is a disadvantage that the polymerization is greatly disturbed by very small amounts of oxygen.

It is also known that butadiene or mixtures of butadiene and styrene may be polymerized in aqueous emulsion using 1,3-dicarbonyl compounds of divalent cobalt and peroxides. With conversions of about 20%, 1,3-diene polymers are obtained which contain a considerable proportion of gel substances and it is difficult to control the polymerization.

It has already been proposed, in our copending U.S. patent application No. 383,512, filed July 16, 1964, to prepare elastomeric 1,3-diene polymers by polymerization of 1,3-dienes using catalysts of:

(A) Chelate complex compounds of trivalent chromium, manganese and/or cobalt and/or of tetravalent cerium and/or of divalent copper with 1,3-dicarbonyl compounds and (B) Organic halogen compounds (indifferent to water) in aqueous emulsion.

The object of this invention is to provide a process for the production of 1,3-diene polymers having a particularly low gel content. Another object of this invention is to provide a process for the production of 1,3-butadiene and isoprene polymers having a particularly low gel content. A further object of the invention is to provide an emulsion polymerization process for the production of 1,3-diene polymers with a lower proportion having 1,2-bonds than poly-1,3-dienes which have been prepared by emulsion polymerization by prior art methods. Furthermore it is an object of this invention to provide a process in which stabilizers for poly-1,3-dienes may be added to the reaction mixture prior to or during polymerization.

We have now found that 1,3-diene polymers can be prepared by polymerization of 1,3-dienes using catalysts of complex compounds of trivalent or tetravalent cobalt having ligands containing nitrogen, and organic halogen compounds which are indifferent to water.

Suitable cobalt complex compounds having ligands containing nitrogen are mononuclear or polynuclear complex compounds, the valency of the cobalt being at least 3. In the case of polynuclear cobalt complexes having two or more cobalt central atoms, the cobalt atoms may have the same or different valency.

Ammonia and hydrazine and their derivatives which bear aliphatic and/or cycloaliphatic hydrocarbon radicals having one to ten carbon atoms are particularly suitable as ligands for the complex compounds. The hydrocarbon radicals may be linear or branched or ethylenically unsaturated and may bear as substituents for example hydroxyl groups. Examples of hydrocarbon radicals are: linear and branched alkylene, alkenyl and alkylidene radicals, for example ethylene, trimethylene, tetramethylene, hexamethylene, octamethylene, decamethylene, 2-ethyltetramethylene, 2 - ethylhexamethylene, 3 - propylpentamethylene, ethylidene, butylidene, octylidene, isopropylidene, 3-methylhexylidene, butene-2-yl, hexene-2-yl and octene-4-yl radicals Examples of suitable cycloaliphatic hydrocarbon radicals are in particular cyclohexyl and cyclohexylidene radicals, and also 4-methylcyclohexyl and decahydro-α-naphthyl radicals. In general suitable cycloaliphatic hydrocarbon radicals have six to ten carbon atoms.

Examples of particularly suitable ligands are ammonia, methylamine, trimethylamine, diethylamine, isobutylamine, hexylamine, octylamine, 2-ethylhexylamine, N-dimethyl-n-hexylamine, ethylene diamine, 1,3-diaminopropane, 1-dimethylamino - 3 - aminopropane, 1-hydroxy-2-aminoethane, N - methylcyclohexylimine, N - ethylcyclohexylimine, polyalkylenimines, such as polyethylenimine and polypropylenimine, having molecular weights of 50 to 250, 1,4-diaminobutane, 1,4-diaminobutene-2, hexamethylene diamine, octamethylene diamine and N,N'-dimethylhydrazine, N,N-diethylhydrazine, trimethylhydrazine, cyclohexanonehydrozone, N-ethylidenehydrazine, N-butylidenehydrazine and hydrazine.

In addition to the nitrogenous ligands, the cobalt complex compounds may also bear other ligands, for example hydroxyl, peroxy, nitro, nitrate, acetate and oxalate groups and/or chlorine, bromine and iodine ions. Examples of anions for neutralization of the charge of the central atoms in the complex compounds are chloride, bromide, iodide, chlorate, bromate, iodate, nitrate, sulfate, oxalate, thiocyanate and acetate ions. The type of anion has practically no influence on the activity of the catalysts.

Examples of suitable cobalt complex compounds are octamine-mu-aminoperoxocobalt(III) - cobalt(IV) chloride, tetraethylenediamine - mu - aminoperoxocobalt(III)-cobalt(IV) nitrate, dichlorohexammine-mu-aminoperoxocobalt(III)-cobalt(IV) sulfate, tetrahydrazine-mu-aminoperoxocobalt(III)-cobalt(IV) sulfate, hexamminetrioldicobalt(III)oxalate, octammine - mu - amino-mu-nitrodicobalt(III) nitrate, tetraethylenediamine-mu-aminooldicobalt(III) acetate, tetraethylenediamine-mu-dioldicobalt(III)chlorate, tetrachlorohexammine - mu - aminodicobalt(III) bromide, sulfatooctammine-mu-iminodicobalt(III) nitrate, nitratoaquotetrahydrazine-mu-aminodicobalt (III) chloride and decammine-mu-peroxodicobalt(III) nitrate and the cobalt complex compounds having the following formulae:

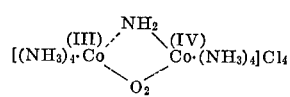

and

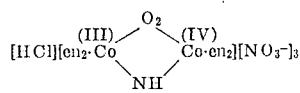

in which "en" stands for an alkylene diamine, such as ethylene diamine, and also

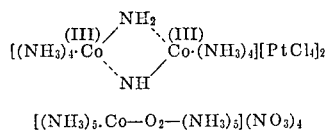

$[(NH_3)_5 \cdot Co-O_2-(NH_3)_5](NO_3)_4$

Mixtures of complex compounds of the said type are, also suitable as polymerization catalysts. The cobalt complex compounds and their production are known for example from Gmelins Handbuch der Anorganischen Chemie, volume "Kobalt," B, System number 58 (1961), pages 334 to 372, and from J. Am. Chem. Soc. 85, (1963) 2915. Complex compounds in which the cobalt atoms are present only in divalent form are not suitable for the process because they have little activity and polymers containing large amounts of gel are obtained. Cobalt complex compounds whose complex dissociation constants (determined according to A. E. Martell and M. Calvin, "Chemistry of the Metal-Chelate-Compounds," Prentice-Hall, New York, 1962, pages 69 to 123) are greater than $10^{-4}$ are preferred for the process.

Halogenated hydrocarbons which in general contain in combination one to ten halogen atoms having atomic weights of from 35 to 128 and which are preferably liquid under the polymerization conditions are especially suitable as organic halogen compounds. These halogenated hydrocarbons have molecular weights of at least 50 but in general not more than 500. They may be derived from linear, branched or cyclic hydrocarbons. Linear, branched or cyclic alkyl halides having one to ten, particularly one to five, carbon atoms are particularly preferred, e.g. methyl chloride, methyl bromide, ethyl chloride, ethyl bromide, ethyl iodide, n-butyl chloride, 2-chlorobutane, isopropyl chloride, 1,2-dichloropropane, n-amyl chloride, dichloromethane, trichloroethylene, chloroform, carbon tetrachloride, 1,2-dichloroethane, 1-chloro-2-bromoethane, cyclohexyl chloride and pentachloroethane. The alkyl halides preferably contain bromine atoms and/or chlorine atoms. Aromatic halohydrocarbons, such as chlorobenzene, bromobenzene and xylylene dichloride, and heterocyclic halogen compounds, such as dichlorophenyl-s-triazine are also suitable.

The ratio in which the complex compounds are mixed with the organic halogen compounds is of great importance for the catalytic activity. The range of good activity lies between 0.5 and 40 moles per mole of cobalt complex compound and the range from 0.5 to 20 moles of halogen compound per mole of cobalt complex compound is preferred. (The molar ratio of organic halogen compound to cobalt complex compound therefore lies in general between 0.5:1 and 40:1, preferably between 0.5:1 and 20:1.) Catalytic activity falls off sharply below and above this range. If more than 40 moles of halogen compounds be used per mole of cobalt complex compound, polymers are obtained which do not exhibit any elastomeric properties under standard conditions.

The amount of catalyst mixture required is in general from 0.001 to 3% by weight, preferably from 0.01 to 1% by weight, with reference to the amount of monomers used.

Conventional emulsifiers, such as alkali metal salts of paraffin sulfonic acids, or sulfonated alkylphenols, and also alkali metal salts of higher fatty acids or of resin acids (dresinates) and protective colloids, such as dextranes, tyloses or polyvinyl alcohols, may be used. They are used in the conventional amounts, for example from 0.5 to 20% by weight with reference to the polymer. Buffer substances and/or regulators, such as dodecylmer- captan, may additionally be contained in the aqueous phase.

1,3-dienes, such as butadiene, isoprene, 2,3-dimethylbutadiene, 2-phenylbutadiene, alone or mixed in any proportions, may be polymerized by the process according to this invention. Suitable 1,3-dienes are linear and in general have four to ten carbon atoms, and butadiene and isoprene are preferred as 1,3-dienes. Other ethylenically unsaturated polymerizable compounds may be copolymerized with the dienes. The proportion of diene with reference to the total amount of monomers should however be at least 50% by weight. Particularly suitable ethylenically unsaturated compounds which are used for copolymerization in proportions of up to 50% by weight with reference to the whole of the monomers are esters of α-ethylenically unsaturated monocarboxylic and dicarboxylic acids having three to four carbon atoms, linear or branched alkanols having one to ten, preferably one to four, carbon atoms, the nitriles of these carboxylic acids, monovinylaromatic compounds having eight to ten carbon atoms and vinyl ethers of linear or branched alkanols having one to five carbon atoms. Examples of suitable comonomers of this type are the methyl, ethyl, propyl, n-butyl, isobutyl, tertiary-butyl and 2-ethylhexyl esters of acrylic acid and methacrylic acid, the methyl, ethyl, isopropyl and n-butyl esters of fumaric acid and maleic acid, acrylonitrile, methacrylonitrile, styrene, α-methylstyrene, o-methylstyrene, m-methylstyrene, p-methylstarene, p-ethylstyrene, vinyl methyl ether, vinyl ethyl ether, vinyl isopropyl, vinyl n-butyl ether and vinylisobutyl ether.

The polymerization temperatures are preferably from 20° to 80° C. It is also possible to use temperatures down to 0° C. and up to about 100° C. Polymerization may be carried out batchwise or continuously. The polymerization vessel for continuous operation may be for example a packed vessel or a cascade of vessels having for example fifteen or more successive boilers. Polymerization is generally carried to a conversion of about 70%. It is possible however to polymerize to higher conversions, for example up to 90%, or particularly advantageously only up to conversions of 55 to 60%.

It is particularly advantageous to emulsify the catalyst components in a portion of the aqueous phase and to supply them to the polymerization vessel in this form. The individual components may however be supplied separately direct to the polymerization vessel.

A particular advantage of the progress is that compounds which are suitable for stabilizing 1,3-polydienes, such as trinonylphenyl phosphite, which do not interfere with the polymerization, may be added not only after but also before or during the polymerization to the polymerization mixture. An optimum stabilizing action may be achieved in this way and the subsequent incorporation of stabilizers, which is far more expensive industrially, may be dispensed with.

The polymers are obtained in the form of an aqueous dispersion which in general contains from 5 to 50% by weight of polymer. It is advantageous to add to the dispersion, prior to precipitation of the polymer, a complex-forming substance which binds the metal ions of the catalyst in the form of water-soluble stable complex compounds. Alkali metal cyanides, alkali metal phosphates or compounds of the type of ethylenediamine tetracetic acid and its derivatives are particularly suitable for this purpose. Practically catalyst-free and, if desired, stabilized polymers are then obtained without special purification measures.

High molecular weight polymers whose K-values are in general from 50 to 150 are obtained by the process. They exhibit a particularly low content of polymers having 1,2-combination which is from about 5 to about 15% by weight, as compared with usually more than 15% by weight in the case of polymers prepared using peroxidic catalysts. The polymers are suitable for example for the production of motor-car tires or as additives to other plastics, such as polyolefins.

The invention is further illustrated by the following examples. The parts specified in the examples are parts by weight. The K-values are measured in 1% solution in benzene (cf. H. Fikentscher, Cellulosechemie, volume 13, (1932), 58), the Mooney plasticity according to ASTM–D 927–57 T and the solution viscosity in 5% solution in styrene with a capillary viscometer according to Ubbelohde.

Example 1

(A) An autoclave is charged with 400 parts of water, 25 parts of a 20% solution of the sodium salt of a higher paraffin sulfonic acid having eight to twelve carbon atoms, 0.3 part of decammine-mu-peroxodicobalt(III) iodide and 0.5 part of n-amyl chloride. 95 parts of butadiene is then added.

A dispersion having a dry content of 12.2% by weight is obtained after a polymerization period of ten hours at 60° C. This is equivalent to a conversion of 63.7%.

0.25 part of trinonylphenyl phosphite is added to the dispersion as a stabiliser. The polymer is then precipitated, processed and dried. It is soluble without gel formation in the conventional solvents and has a K-value of 81 and a solution viscosity of 86 centipoises. The Mooney plasticity ML–4′/100° C. is 46 and the Defo value at 30° C. is 1000/53, and at 80° C. 525/45 (measured according to DIN 53514).

(B) If however the butadiene be added continuously during the course of five hours in the polymerization according to (A) there is obtained, under otherwise the same conditions, a dispersion having a dry content of 9.8% by weight, equivalent to a conversion of 52.4%. The K-value of the polybutadiene is 77.5 and its solution viscosity is 85 centipoises.

(C) If the complex compound, the n-amyl chloride and the trinonylphenyl phosphite be added continuously in the course of five hours, there is obtained, under otherwise the same conditions as in (A), a dispersion having a dry content of 11.4% by weight, equivalent to a conversion of 61.5%. The K-value of the polybutadiene is then 84 and its solution viscosity is 113 centipoises.

(D) If 0.4 part of dodecylmercaptan be added to the polymerization mixture according to (A), a product is obtained having a K-value of 71 and a solution viscosity of 96 centipoises.

Example 2

Polymerization is carried out as described in Example 1 under (A) but the complex compounds used is trichlorohydroxohexammine - mu - peroxocobalt(III)-cobalt(IV) chloride and 0.5 part of trinonylphenyl phosphite is added prior to the polymerization. Under otherwise the same conditions, a dispersion is obtained having a dry content of 11.2% by weight. The polybutadiene obtained is soluble without gel formation in the conventional solvents. Its metal content is less than 2 parts of metal per million parts of polymer.

Example 3

Polymerization is carried out as described in Example 1 but 5 parts of styrene is added. A dispersion is obtained having a dry content of 12.6% by weight, equivalent to a conversion of 64%.

The K-value of the copolymer, which is soluble without gel formation in the conventional solvents, is 73, its solution viscosity is 35.8 centipoises, its strength is 260 kg./sq. cm. and its elongation 435%.

Example 4

Polymerization is carried out as in Example 1 (A) but 5 parts of vinyl ethyl ether is added. A dispersion is obtained having a dry content of 11.3% by weight, equivalent to a conversion of 57%. 2 parts of β-naphthylamine serves as stabilizer. The K-value of the copolymer, which dissolves without gel formation, is 79 and its solution viscosity is 109 centipoises.

Example 5

An autoclave is charged with 500 parts of water, 40 parts of a 20% solution of potassium salts of resin acids, 0.5 part of hexammine-mu-aminoolperoxocobalt(III)-cobalt(IV) nitrate, 5 parts of carbon tetrachloride, 100 parts of styrene and 300 parts of butadiene. Polymerization is carried on for ten hours at 50° C. A dispersion is obtained having a dry content of 27% by weight, equivalent to a conversion of 63%.

2 parts of trinoylphenyl phosphite is added as a stabilizer during the polymerization. The K-value of the polymer, which dissolves without gel formation, is 92 and its solution viscosity is 148 centipoises. By using 100 parts of a mixture of equal parts of styrene and acrylonitrile instead of styrene, a dispersion is obtained having a dry content of 29% by weight, equivalent to a conversion of 66.5%.

Example 6

Mixture of:

(a) 570 parts of water and 25 parts of a 20% solution of the sodium salt of a fatty acid having fifteen to twenty carbon atoms, and (b) 0.5 part of tetraethylenediamine-mu-iminoperoxocobalt(III)-cobalt(IV) bromide, 10 parts of chloroform, 1 part of trinonylphenyl phosphite and 120 parts of butadiene, are introduced separately per hour into a packed vessel. Polymerization is carried out at 35° C. and the mean residence period of the reaction mixture in the packed vessel is ninety minutes. A dispersion is obtained having a dry content of 10% by weight, equivalent to a conversion of 58%.

The K-value of the polymer, which dissolves without gel formation, is 82 and its solution viscosity is 92 centipoises.

If polymerization be carried out as above but at 10° C., the dry content of the dispersion obtained is 6.5% by weight, equivalent to a conversion of 36%, the polymer, which dissolves without gel formation, having a K-value of 79 and a solution viscosity of 79.5 centipoises.

Example 7

An autoclave is charged with 40 parts of water, 4.5 parts of a 20% solution of sodium salts of a mixture of sulfonated fatty acids having ten to fifteen carbon atoms, 0.2 part of carbon tetrachloride, 0.05 part of dodecylmercaptan, 5 parts of butadiene and 0.5 part of decammine-mu-peroxocobalt(III)-cobalt(IV) nitrate. 15 parts of butadiene and 10 parts of butyl acrylate are added during the course of five hours at 50° C. Then polymerization is allowed to continue for five hours at 60° C. A dispersion is obtained having a dry content of 30.5% by weight, equivalent to a conversion of 81%.

The K-value of the copolymer is 93.5 and its solution viscosity is 173 centipoises.

Example 8

An autoclave is charged with 500 parts of water, 40 parts of a 20% solution of the potassium salts of resin acids, 0.5 part of tetrahydrazine-mu-aminoperoxocobalt (III)-cobalt(IV) sulfate, 5 parts of chloroform, 100 parts of styrene and 100 parts of butadiene. Polymerization is carried on for ten hours at 50° C. A dispersion is obtained having a dry content of 17% by weight. The K-value of the polybutadiene is 79.5, its Mooney-plasticity $$ML-4'=30.5$$

at 100° C.

If 0.5 part of sulfatooctammine-mu-iminodicobalt (III) nitrate be used as catalyst instead of the tetrahydrazine compound, a dispersion is obtained whose dry content is 19.3% by weight and which contains a polybutadiene having a K-value of 82.

Example 9

An autoclave is charged with 40 parts of water, 4.5 parts of a 20% solution of potassium salts of a mixture of fatty acids having ten to fifteen carbon atoms which has been sulfonated in the conventional way, 1 part of carbon tetrachloride, 30 parts of butadiene, 0.2 part of nitratoaquotetrahydrazine - mu - aminodicobalt(III)chloride and 0.3 part of dodecylmercaptan. A total of 20 parts of styrene is added gradually at 50° C. during the course of five hours. The whole is then polymerized for five hours at 60° C. A dispersion is obtained having a dry content of 29.5% by weight and which contains a polybutadiene having a K-value of 89.

By using isoprene as the monomer instead of butadiene, a dispersion is obtained under otherwise the same conditions whose dry content is 14.3% by weight. The K-value of the polyisoprene obtained is 78.

If the polymerization fo butadiene be carried out with 0.2 part of a mixture of equal parts of tetrachlorohexammine-mu-aminodicobalt(III) bromide and nitratoaquotehydrazine-mu-aminodicobalt(III) chloride under otherwise the same conditions, a dispersion is obtained whose dry content is 35% by weight and which contains polybutadiene having a K-value of 93.

We claim:

1. A process for the production of 1,3-diene polymers by polymerization of open-chain 1,3-dienes which have four to ten carbon atoms in aqueous emulsion using catalysts of:
    (A) complex compounds of cobalt in which the cobalt is at least trivalent selected from the group consisting of
        octamine-mu-aminoperoxocobalt(III)-cobalt(IV) chloride,
    tetraethylenediamine-mu-aminoperoxocobalt(III)-cobalt(IV) nitrate,
        dichlorohexammine-mu-aminoperoxocobalt(III)-cobalt(IV) sulfate,
        tetrahydrazine-mu-aminoperoxocobalt(III)-cobalt(IV) sulfate,
        hexamminetrioldi-cobalt(III) oxalate,
        octammine-mu-amino-mu-nitrodicobalt(III) nitrate,
        tetraethylenediamine-mu-aminooldicobalt(III) acetate,
        tetraethylenediamine-mu-dioldicobalt(III) chlorate,
        tetrachlorohexammine-mu-aminodicobalt(III) bromide,
    sulfatooctammine-mu-iminodicobalt(III) nitrate,
        nitratoaquotetrahydrazine-mu-aminodicobalt(III) chloride,
        decammine-mu-peroxodicobalt(III) nitrate,

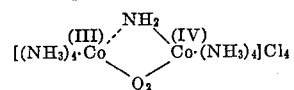

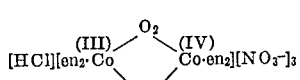

in which "en" stands for an alkylene diamine,

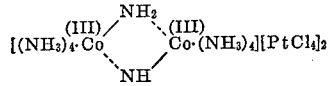

$[(NH_3)_5 \cdot Co—O_2—(NH_3)_5](NO_3)_4$, and mixtures thereof;
    (B) halogenated hydrocarbons containing one to ten halogen atoms having atomic weights of from 35 to 128.

2. A process for the production of 1,3-diene polymers by copolymerization of open-chain 1,3-dienes which have one to ten carbon atoms with up to 50% by weight (with reference to the whole of the monomers) of ethylenically unsaturated compounds selected from the group consisting of esters of α-ethylenically unsaturated monocarboxylic ard dicarboxylic acids having three to four carbon atoms and alkanols having one to ten carbon atoms, nitriles of monocarboxylic and dicarboxylic acids having three to four carbon atoms, monovinylaromatic compounds having eight to ten carbon atoms and vinyl ethers of alkanols having one to five carbon atoms, in aqueous emulsion using catalysts of:
    (A) complex compounds of cobalt in which the cobalt is at least trivalent, selected from the group consisting of
        octamine-mu-aminoperoxocobalt(III)-cobalt(IV) chloride,
    tetraethylenediamine-mu-aminoperoxocobalt(III)-cobalt(IV) nitrate,
        dichlorohexammine-mu-aminoperoxocobalt(III)-cobalt(IV) sulfate,
        tetrahydrazine-mu-aminoperoxocobalt(III)-cobalt(IV) sulfate,
    hexamminetrioldicobalt(II) oxalate,
        octammine-mu-amino-mu-nitrodicobalt(III) nitrate,
        tetraethylenediamine-mu-aminooldicobalt(III) acetate,
        tetraethylenediamine-mu-dioldicobalt(III) chlorate,
        tetrachlorohexammine-mu-aminodicobalt(III) bromide,
    sulfatooctammine-mu-iminodicobalt(III) nitrate,
        nitratoaquotetrahydrazine-mu-aminodicobalt(III) chloride,
        decammine-mu-peroxodicobalt(III) nitrate,

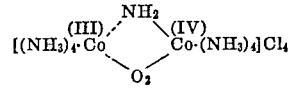

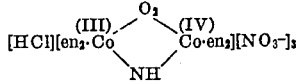

in which "en" stands for an alkylene diamine,

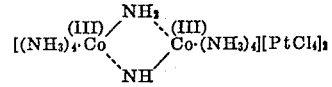

$[(NH_3)_5 \cdot Co—O_2—(NH_3)_5](NO_3)_4$, and mixtures thereof, and
    (B) halogenated hydrocarbons having one to ten halogen atoms having atomic weights of from 35 to 128 in combination therein.

3. A process for the production of 1,3-diene polymers by polymerization of open-chain 1,3-dienes selected from the group consisting of butadiene and isoprene in aqueous emulsion using catalysts of:
    (A) complex compounds of cobalt in which the cobalt is at least trivalent, selected from the group consisting of
        octamine-mu-aminoperoxocobalt(III)-cobalt(IV) chloride,
    tetraethylenediamine-mu-aminoperoxocobalt(III)-cobalt(IV) nitrate,
        dichlorohexammine-mu-aminoperoxocobalt(III)-cobalt(IV) sulfate,
        tetrahydrazine-mu-aminoperoxocobalt(III)-cobalt(IV) sulfate,
    hexaminetrioldicobalt(III) oxalate,
        octammine-mu-amino-mu-nitrodicobalt(III) nitrate,
        tetraethylenediamine-mu-aminooldicobalt(III) acetate,
        tetraethylenediamine-mu-dioldicobalt(III) chlorate,
        tetrachlorohexammine-mu-aminodicobalt(III) bromide, sulfatooctammine-mu-iminodicobalt(III) nitrate,
nitratoaquotetrahydrazine-mu-aminodicobalt(III) chloride,
decammine-mu-peroxodicobalt(III) nitrate,

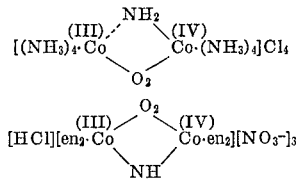

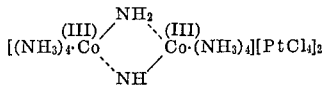

in which "en" stands for an alkylene diamine,

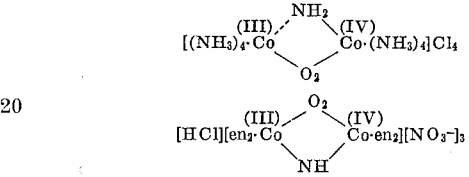

[(NH₃)₅·Co—O₂—(NH₃)₅](NO₃)₄, and mixtures thereof, and (B) halogenated hydrocarbons which contain one to ten halogen atoms combined therein having atomic weights of from 35 to 128, the molar ratio of B:A being from 0.5:1 and 40:1 and the amount of A+B being from 0.001 to 3% by weight with reference to the amount of monomers.

4. A process for the production of 1,3-diene polymers by copolymerization of butadiene with up to 50% by weight (with reference to the whole of the monomers) of ethylenically unsaturated compounds selected from the group consisting of esters of α-ethylenically unsaturated monocarboxylic and dicarboxylic acids having three to four carbon atoms and alkanols having one to ten carbon atoms, nitriles of monocarboxylic and dicarboxylic acids having three to four carbon atoms, monovinylaromatic compounds having eight to ten carbon atoms and vinyl ethers of alkanols having one to five carbon atoms, in aqueous emulsion using catalysts of:

(A) complex compounds of cobalt in which the cobalt is at least trivalent selected from the group consisting of octamine-mu-aminoperoxocobalt(III)-cobalt(IV) chloride,
tetraethylenediamine-mu-aminoperoxocobalt(III)-cobalt(IV) nitrate,
dichlorohexammine-mu-aminoperoxocobalt(III)-cobalt(IV) sulfate,
tetrahydrazine-mu-aminoperoxocobalt(III)-cobalt(IV) sulfate,
hexamminetrioldicobalt(III) oxalate,
octammine-mu-amino-mu-nitrodicobalt(III) nitrate,
tetraethylenediamine-mu-aminooldicobalt(III) acetate,
tetraethylenediamine-mu-dioldicobalt(III) chlorate,
tetrachlorohexammine-mu-aminodicobalt(III) bromide,
sulfatoctamimne-mu-imminodiocobalt(III) nitrate,
nitratoaquotetrahydrazine-mu-aminodicobalt(III) chloride,
decammine-mu-peroxodicobalt(III) nitrate,

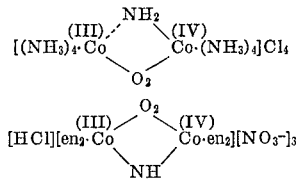

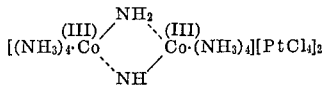

in which "en" stands for an alkylene diamine,

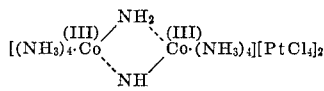

[(NH₃)₅·Co—O₂—(NH₃)₅](NO₃)₄, and mixtures thereof, and (B) halogenated hydrocarbons containing one to ten halogen atoms in combination therein having atomic weights of from 35 to 128, the molar ratio B:A being from 0.5:1 to 40:1 and the amount A+B being from 0.001 to 3% by weight with reference to the amount of monomers.

References Cited
UNITED STATES PATENTS

| | | | |
|---|---|---|---|
| 3,226,376 | 12/1965 | Smith | 260—94.3 |
| 2,380,617 | 7/1945 | Stewart et al. | 260—82.5 XR |
| 3,296,220 | 1/1967 | Kastning et al. | 260—78.5 |

JOSEPH L. SCHOFER, *Primary Examiner.*

J. KIGHT, *Assistant Examiner.*

UNITED STATES PATENT OFFICE
CERTIFICATE OF CORRECTION

Patent No. 3,412,075                      November 19, 1968

Herbert Naarmann et al.

It is certified that error appears in the above identified patent and that said Letters Patent are hereby corrected as shown below:

Column 3, line 14, "are," should read -- are --. Column 4, line 48, "progress" should read -- process --. Column 5, line 50, "compounds" should read -- compound --. Column 6, line 23, "Mixture" should read -- Mixtures --. Column 7, line 21, "fo" should read -- of --. Column 8, line 23, "(II)" should read -- (III) --. Column 9, line 1, "iminodlcobalt" should read -- iminodicobalt --.

Signed and sealed this 21st day of April 1970.

(SEAL)
Attest:

Edward M. Fletcher, Jr.                  WILLIAM E. SCHUYLER, JR.
Attesting Officer                          Commissioner of Patents